United States Patent [19]

Mrdjenovich et al.

[11] Patent Number: 5,063,992
[45] Date of Patent: Nov. 12, 1991

[54] HOLLOW CONNECTING ROD

[75] Inventors: Robert Mrdjenovich, Brighton; David A. Yeager, Plymouth, both of Mich.

[73] Assignee: Ford Motor Company, Dearborn, Mich.

[21] Appl. No.: 651,161

[22] Filed: Feb. 6, 1991

Related U.S. Application Data

[62] Division of Ser. No. 388,101, Jul. 3, 1989.

[51] Int. Cl.[5] .............................................. B22C 9/02
[52] U.S. Cl. ..................................... 164/516; 164/34; 164/45
[58] Field of Search ................... 164/516, 122.1, 122.2, 164/34, 35, 45

[56] References Cited

U.S. PATENT DOCUMENTS

| | | |
|---|---|---|
| 1,249,825 | 12/1917 | Putnam . |
| 1,307,454 | 6/1919 | Pittman et al. . |
| 1,898,100 | 2/1933 | Skillman . |
| 1,981,609 | 11/1934 | Berland . |
| 2,428,602 | 10/1947 | Yingling . |
| 2,926,975 | 3/1960 | Karde et al. . |
| 2,995,953 | 8/1961 | Fazi . |
| 3,258,816 | 7/1966 | Rearwin . |
| 3,431,796 | 3/1969 | Valbjorn . |
| 3,482,468 | 12/1969 | DeBiasse . |
| 3,730,020 | 5/1973 | DiMatteo, Sr. et al. . |
| 4,216,682 | 8/1980 | Ban et al. . |
| 4,283,835 | 8/1981 | Obrochta et al. ...................... 164/45 |
| 4,289,191 | 9/1981 | Myllymaki ............................ 164/34 |
| 4,340,107 | 7/1982 | Bauer .................................... 164/35 |
| 4,352,387 | 10/1982 | Yamaguchi . |
| 4,353,267 | 10/1982 | Robert . |
| 4,417,381 | 11/1983 | Higginbotham ...................... 164/35 |
| 4,466,387 | 8/1984 | Perry . |
| 4,671,336 | 6/1987 | Anahara et al. . |
| 4,712,605 | 12/1987 | Sasaki et al. . |
| 4,836,045 | 6/1989 | Löbia . |

FOREIGN PATENT DOCUMENTS

| | | |
|---|---|---|
| 514359 | 3/1921 | France . |
| 62-263844 | 11/1987 | Japan ..................................... 164/34 |
| 86/4122 | 7/1986 | PCT Int'l Appl. . |
| 669105 | 7/1979 | U.S.S.R. . |
| 512776 | of 1937 | United Kingdom . |
| 592727 | 9/1947 | United Kingdom . |
| 756298 | 9/1956 | United Kingdom . |

Primary Examiner—Kuang Y. Lin
Attorney, Agent, or Firm—Joseph W. Malleck; Clifford L. Sadler

[57] ABSTRACT

A precision cast connecting rod which has an elongate tubular shank member defining a hollow section for producing desired stiffness to weight characteristics. Piston and crankpin connecting members are attached to opposite ends of the shank member. The connecting members are provided with passages which extend axially therewithin from the hollow section. Defined within the elongate tubular shank member is a radially extending central aperture. A precision casting method for preparing the hollow connecting rod includes forming an elongate core with a locating member positioned at each end thereof and a disk-shaped protuberance extending radially therefrom. The core is secured in a die and defines a cavity therebetween for preparing a pattern of the connecting rod using a molding material which substantially encapsulates the core within the cavity. After removing the pattern from the die, coatings of refractory material are applied to form a shell mold which encrusts the pattern. Removal of the molding material results from heating the shell mold. The connecting rod is formed by filling the cavity with molten metal and then cooling the shell mold. Unwanted material is eliminated from the connecting rod by separating the shell mold from the solidified metal and removing the core from the hollow section, thereby producing a near net shape of the connecting rod.

10 Claims, 5 Drawing Sheets

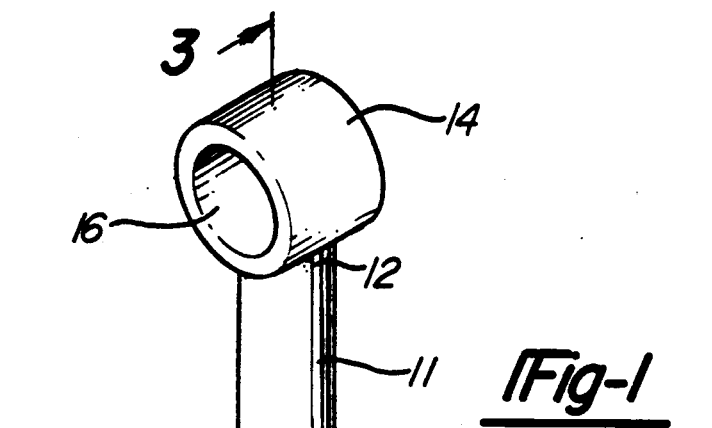
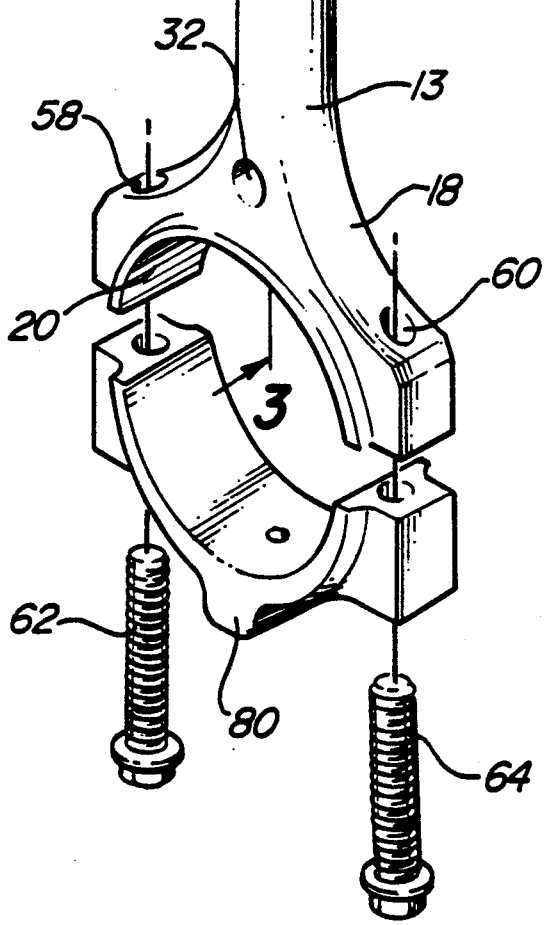
Fig-1
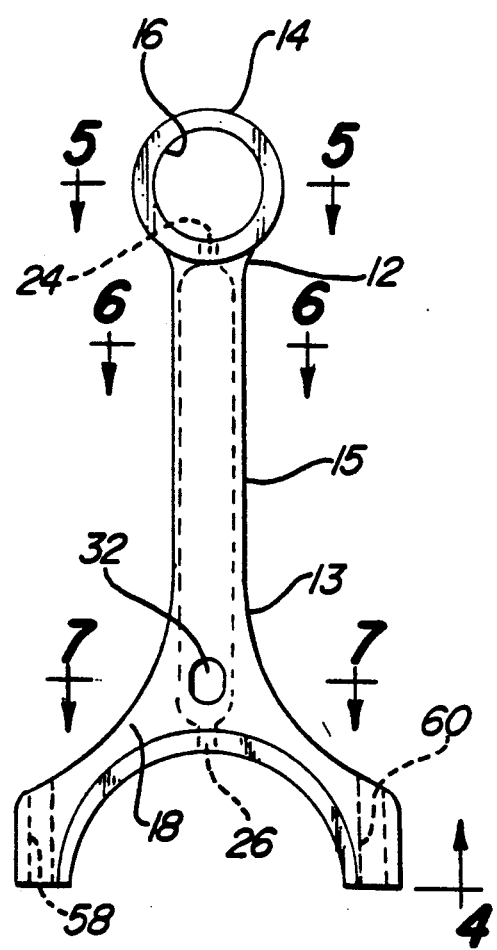
Fig-2

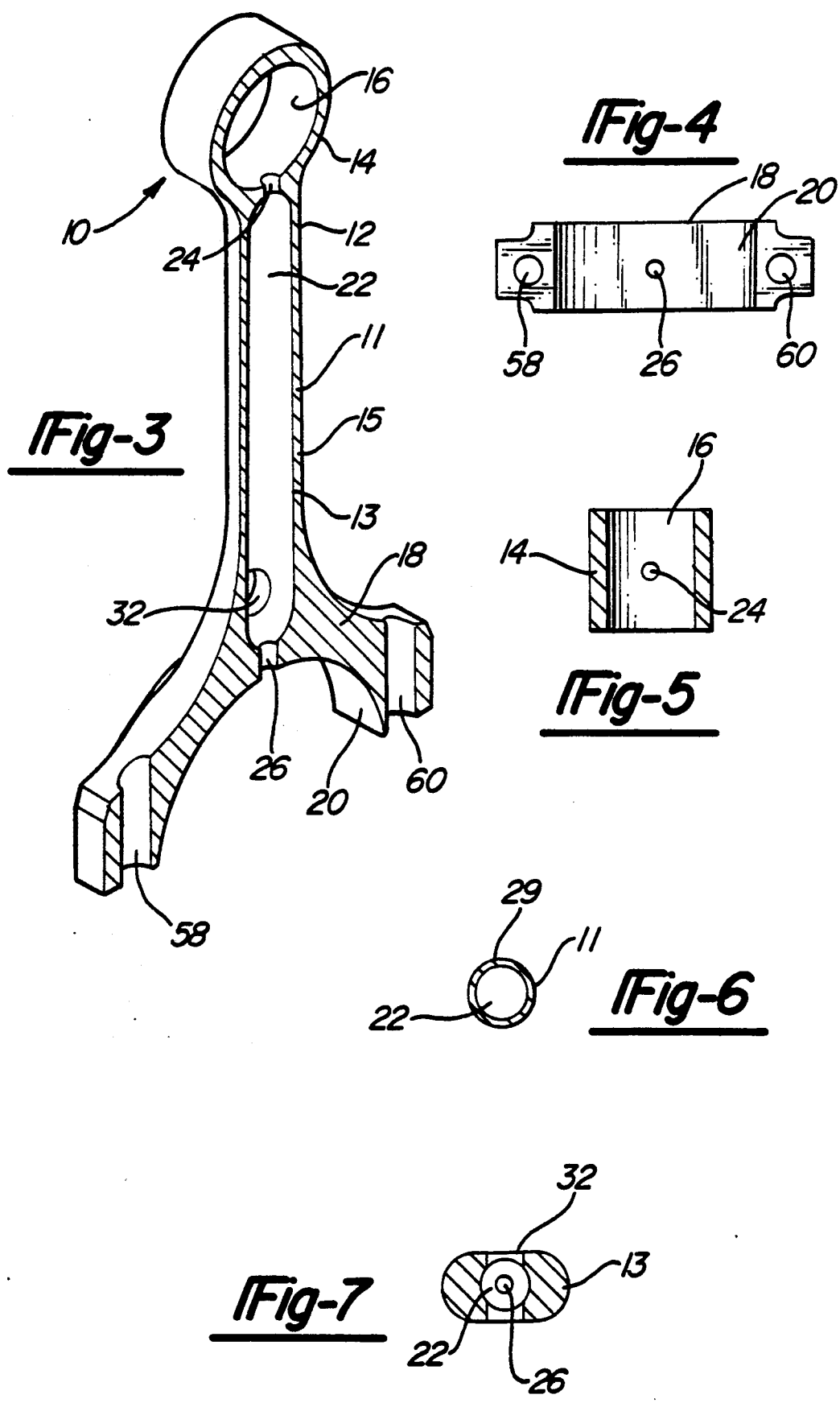

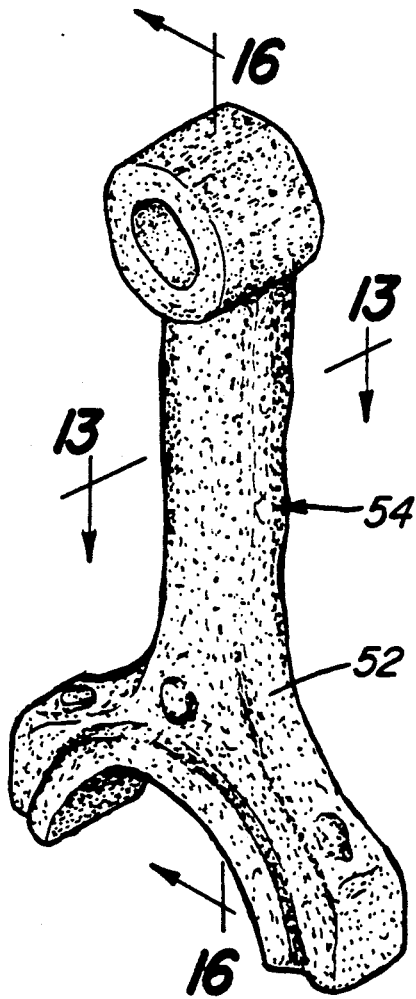
*Fig-12*
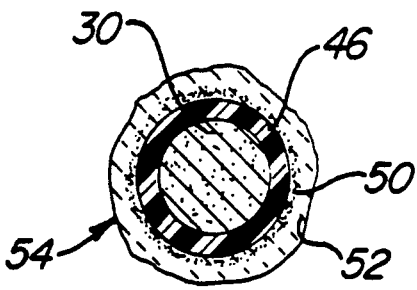
*Fig-13*
*Fig-14*
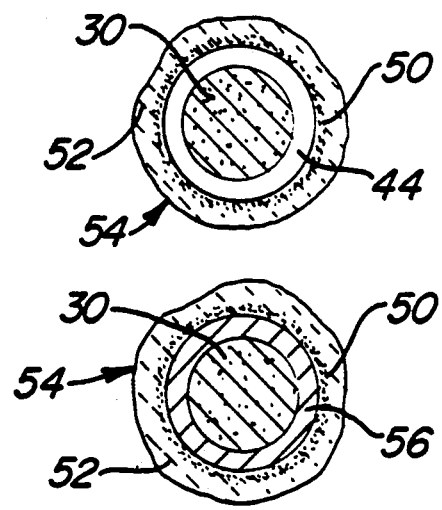
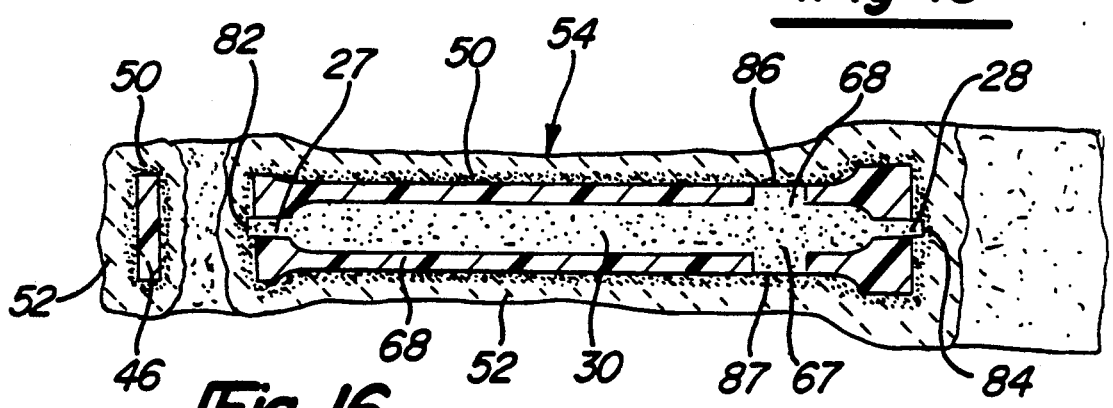
*Fig-15*
*Fig-16*

HOLLOW CONNECTING ROD

This is a division of copending application Ser. No. 388,101, filed on July 31, 1989.

BACKGROUND OF INVENTION

This is a division of copending application Ser. No. 388,101, filed on July 31, 1989.

1. Field of Invention

The present invention relates generally to a connecting rod having a hollow section and a method for casting the connecting rod. More particularly, the present invention relates to a process for casting the hollow connecting rod precisely to a near net shape, the hollow connecting rod having a thin cylindrical wall to produce desirable stiffness to weight characteristics. The invention also relates to an apparatus for performing the method.

2. Description of the Related Art

As is well known, many engines, such as an internal combustion engine, require for their operation at least four basic parts: (1) a cylinder; (2) a piston; (3) a connecting rod; and (4) a crank shaft. Reciprocating linear movement of the piston within the cylinder, produced by the burning of fuel, results in the generation of power from the engine. When the piston is driven downward by the pressure of expanding gases in the cylinder, one end of the connecting rod moves downward with the piston in a straight line. The lower end of the connecting rod moves down and in a generally circular motion at the same time. Together, the crank shaft and connecting rod transmute linear to rotary motion.

During this process, the connecting rod is subjected to tensile, compressive, and bending forces. The high bending stresses are superimposed on the forces associated with tension and compression. Bending stresses tend to cause buckling, even where the connecting rod may be strong enough to withstand other forces exerted thereupon.

To meet challenges posed by fuel economy standards and competitive pressures, improvements in connecting rods for internal combustion engines have included the adoption of light weight designs which are capable of withstanding the stresses developed in internal combustion engines while operating at high rates of power output. When producing high horsepower at elevated rotational speeds, common failures include the breaking of connecting rods due to the enormous stresses developed under such operational conditions.

Often, the most destructive loads imposed on connecting rods are those imposed at top dead center by inertia during the exhaust stroke of the engine. In this configuration, the inertia loads are at a maximum level, while opposing gas forces are at a minimum. Such inertia forces are transmitted to the connecting rod with the result that failure occurs with consequent damage to or destruction of the engine. Solutions include decreasing the weight of the reciprocating parts, such as the connecting rod and the piston, or increasing the strength of the connecting rod. Such approaches have long been recognized and have been disclosed in, for example, U.S. Pat. No. 3,482,468.

To meet design needs such as those described above, several types of connecting rods have been provided heretofore, including rods of an I- or H-beam cross-section, and solid cylindrical or tubular shank members. Each type of rod, however, tends to be somewhat heavy and cannot be operated for any substantial period at high speeds without failure. Modes of imminent or actual failure include deformation of the portion of the rod connected to the piston and deformation or destruction of the portion of the rod connected to the crank shaft, together with bending or breakage of the rod as a result of forces acting thereupon. While the H-beam type of rod often has greater rigidity than either the solid, tubular, or I-beam types of rods, even the H-section rod sometimes has poor characteristics at high rotational speeds, which causes failure of the rods.

Tubular connecting rods that have previously been known exhibit considerable stiffness or rigidity up to a point where flexing during operation exceeds the elastic limit of the rod. Buckling results beyond the elastic limit, which causes damage to the engine.

Currently produced connecting rods are typically made from either a forged steel, cast iron, or powder metallurgical process. Wall thicknesses attainable by forging may only be as low as about 3.0 mm. By powder metallurgical techniques, only about 2.8 mm in wall thickness can be realized. Thus, the designer's need for lightness remains unsatisfied by conventional approaches. Also, the section connecting the small and large ends of the connecting rod typically has rough surface features which result from the manufacturing process. Furthermore, significant costs are usually associated with finishing conventional connecting rods and in drilling bolt holes which accommodate bolts which fasten the connecting rod to the crank shaft.

To produce hollow cast articles such as connecting rods, core molds have conventionally been used in known casting processes. Such cores are typically prepared by shaping a core material from an aggregate mixture, such as alumina or zirconia, and a binder, such as ethyl silicate, and then baking the core. However, it is difficult to prepare cores with precise dimensions since conventional cores tend to expand during baking or shrink during drying or cooling, thereby losing their dimensional stability. Other problems of conventional core approaches are that core quality is often irregular, thereby jeopardizing production efficiency and often leading to high production costs because of the need to resort to expensive remedial measures.

Under conventional processes, precise casting is elusive because the core tends to move within the die before and during injection of a molding material, thereby thwarting the attainment of a connecting rod conforming to a near net shape. After melting and removal of molding material from the shell mold, the problems of secure retention by the shell mold of the core are exacerbated by hydrodynamic forces associated with the swirling flow of molten metal.

SUMMARY OF INVENTION

The present invention solves the above problems by providing a precision cast connecting rod comprising an elongate tubular shank member which includes a thin wall. A piston connecting member is attached to one of the ends of the elongate tubular shank member and a round surface is included therewithin for cooperating with a piston wrist pin. The piston connecting member defines a first passage extending axially with respect to the shank member to the round surface. A crankpin connecting member is attached to the opposite end of the shank member. Included in the crankpin connecting member is a generally semi-circular surface which is adapted to cooperate rotatably with a crankpin. Defined within the crankpin connecting member is a second axial passage which extends to the semi-circular surface. A hollow section for producing desired stiffness to weight characteristics in the connecting rod is defined within the elongate tubular shank member and the piston and crankpin connecting members.

In the preferred embodiment of the present invention, the elongate tubular shank member is provided with a central aperture extending radially therethrough near the crankpin connecting member. The central aperture is used for removing a core after casting, the core being complimentary with the hollow section, the passages, and the central aperture. To obviate the need for a drilling and machining step, the preferred connecting rod also includes a pair of bolt holes extending through the crankpin connecting member for receiving bolts therethrough, which attach to the crankpin connecting member to the crankpin.

In order to produce a connecting rod, the dimensions and surface finish of which conform to precise engineering tolerances, a precision casting process is taught. The process includes the step of preparing an elongate core having a locating member positioned at each end thereof and a pair of disk-shaped protuberances extending radially therefrom. The core defines the hollow section in the elongate tubular shank member. Each locating member defines one of the passages extending axially from the hollow section, and the disk-shaped protuberances define the central aperture which extends radially from the hollow section. The core has an outer contour which substantially corresponds to a desired inner contour of the finished connecting rod. Next, the core is secured in a molding material injection die by a pair of retainers which engage the locating members of the core so that the core cooperates with the die to define a cavity therebetween for forming a pattern of the connecting rod. After injecting a molding material into the cavity and cooling, the molding material substantially encapsulates the core.

After removal of the pattern from the die, the pattern is repeatedly coated with a refractory material to form a shell mold which encrusts the pattern. The shell mold, the locating members, and the protuberances of the core cooperate within the shell mold to secure the core precisely therewithin and to facilitate precise dimensional control of the connecting rod.

Removal of the molding material from the shell mold is achieved by a heating step. Following evacuation of the molding material, the core is precisely held within the shell mold so that the connecting rod may satisfy exacting dimensional constraints. While the position of the core in relation to the shell mold is maintained, the cavity between the core and the shell mold is filled with molten metal and then cooled to form a near net shape of the connecting rod. Next, the shell mold is disassociated from the solidified metal and the core is removed from the hollow section via the passages and the central aperture to eliminate unwanted material.

Also disclosed by the present invention is an apparatus for manufacturing a near net shape connecting rod by a precision casting process. The apparatus includes the die and the elongate core for forming the pattern of the connecting rod. The locating members extending from the elongate core each define one of the passages which extend axially from the hollow section in the elongate tubular shank member of the connecting rod. Means for retaining the core in relation to the die are mounted therewithin, each retaining means engaging a locating member so that the core is securely positioned during pattern preparation.

Accordingly, it will be seen that the invention is a precision cast hollow connecting rod which is prepared to a near net shape and which has thin walls which produce optimal strength to weight characteristics. The invention also includes the process by which the near net shape connecting rod is made, including the step of precisely locating the core within the die prior to and during wax injection, and within the shell mold prior to and during the injection of molten metal. To accomplish these facets of the invention, the invention includes the manufacturing apparatus by which the process is practiced. The apparatus includes retaining means mounted within the die to securely hold the core so that a precise pattern of the hollow connecting rod can be prepared.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a perspective, exploded view of a connecting rod assembly illustrating the connecting rod of the present invention;

FIG. 2 is a front elevation view of the connecting rod of the present invention;

FIG. 3 is a longtitudinal sectional view of the connecting rod of the present invention taken along the line 3—3 of FIG. 1;

FIG. 4 is a bottom view of the connecting rod of the present invention taken along the line 4—4 of FIG. 2;

FIG. 5 is a transverse sectional view of the connecting rod of the present invention taken along the line 5—5 of FIG. 2;

FIG. 6 is a transverse sectional view of the connecting rod of the present invention taken along the line 6—6 of FIG. 2;

FIG. 7 is a transverse sectional view of the connecting rod of the present invention taken along the line 7—7 of FIG. 2;

FIG. 12 is a perspective view of the shell mold which encrusts the pattern of the connecting rod of the present invention;

FIG. 13 is a transverse sectional view through the shell mold along the line 13—13 of FIG. 12 prior to removal of the molding material;

FIG. 14 is a transverse sectional view through the shell mold along the same line as FIG. 13 after removal of the molding material and before the pouring of molten metal to form the connecting rod of the present invention;

FIG. 15 is a transverse sectional view through the shell mold along the same line as FIGS. 13 and 14 before removal of the core; and FIG. 16 is a longitudinal sectional view through the shell mold taken perpendicularly to the line 13—13 before removal of the molding material, illustrating how the shell mold secures the core firmly in place relative thereto.

DESCRIPTION OF PREFERRED EMBODIMENTS

Figure 8:
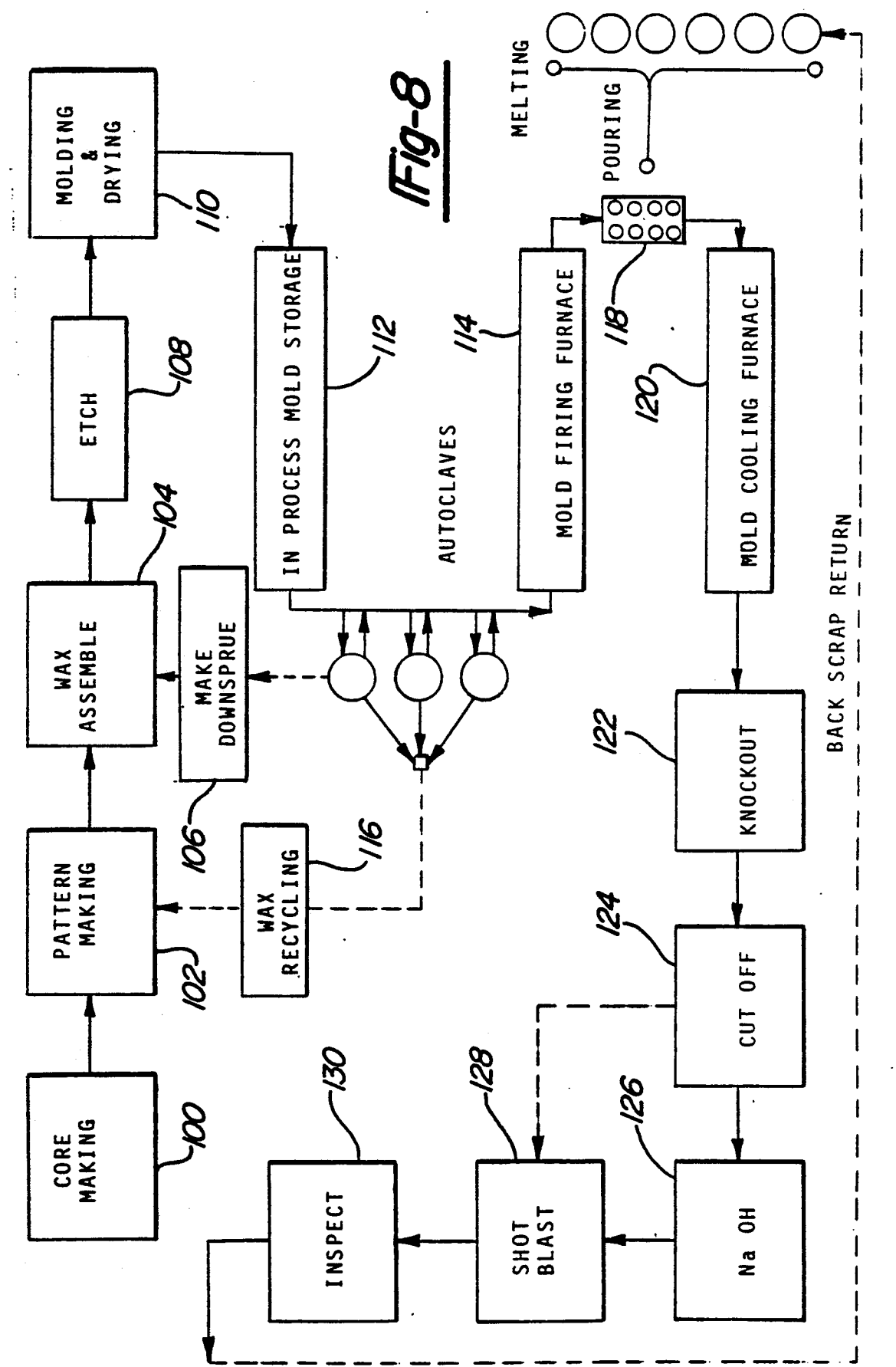
FIG. 8 is a flow diagram showing the steps of the process of the present invention.

With reference to FIG. 1 of the drawings, there is depicted a connecting rod 10 for use in an engine, the connecting rod 10 comprising an elongate tubular shank member 11 having two opposite ends 12, 3. Attached to one of the ends is a piston connecting member 14 which includes a round surface 16 for cooperating with a piston wrist pin. At the opposite end of the shank member is a crankpin connecting member which has a generally semi-circular surface 20 for cooperating rotatably with a crankpin when secured thereto by a big end member 80 and bolts 62, 64.

As best shown in FIGS. 2-7, the piston connecting member 14 defines a first passage 24 which extends axially with respect to the shank member 11 to the round surface 16. Provided within the crankpin connecting member 18 is a second passage 26 extending to the semi-circular surface 20, again axially with respect to the shank member. Referring to FIG. 2, it will be appreciated that the cylindrical surface 20 can be considered as being terminated by edges 21 connected by an imaginary line (not shown) extending along the reference line 4—4. The imaginary line lies orthogonally to the elongated tubular shank member 11. As is best seen in FIG. 3, the elongate tubular shank member 11 and the piston and crankpin connecting members 14, 18 define therebetween a hollow section 22 with a thin wall 15 for producing desired stiffness to weight characteristics in the connecting rod 10.

Taken together, FIGS. 1-3 and 7 depict a central aperture 32 which is provided within the elongate tubular shank member 11. The central aperture 32 extends radially through the elongate tubular shank member 11 proximate the crankpin connecting member 18 of the connecting rod 10 for removing a core 30 after casting. The core 30 is complementary with the hollow section 22, the passages 24, 26, and the central aperture 32.

A pair of bolt holes 58, 60 extend through the crankpin connecting member 18 for receiving bolts 62, 64 therethrough which attach the crankpin connecting member 18 to the crankpin. As depicted in FIGS. 2, 3, and 6, the elongate tubular shank member 11 is provided with a wall 15 having a thickness of about 2.5 mm. Following the teachings of the present invention, wall thicknesses down to about 0.5 mm–0.75 mm are possible.

In making and using the invention, persons skilled in the art will appreciate that medium carbon alloy steel, medium carbon steel, austempered iron, or ductile iron may be among the materials selected for the connecting rod 10. Where steel is selected, wall thicknesses of about 2.0 mm are desirable, with an outside shank diameter of about 15.0 mm. Such wall thicknesses and shank diameters have been found to enable the elongate tubular shank member 11 to withstand significant tensile and compressive loads while exhibiting favorable fatigue properties. For example, at 7,000 rpm, tensile loads up to 6,000 pound weight and compressive loads up to 10,000 pound weight are theoretically achievable without discernable degradation of the connecting rod 10 taught by the present invention.

Turning once again to FIGS. 3-6, it is evident that the elongate tubular shank member 11 is generally annular in cross-section throughout most of its length. The annular cross-section 29 has inside and outside diameters which are substantially constant along most of the length of the elongate tubular shank member 11.

Returning now to FIG. 8, the connecting rod 10 of the present invention is prepared by first making the elongate core 30 (step 100). The elongate core 30 has locating members 27, 28 positioned at each end thereof and disk-shape protuberances 66, 67 extending radially therefrom. The core 30 defines the hollow section 22 in the elongate tubular shank member 11, and each locating member 27, 28 defines one of the passages 24, 26 which extend axially from the hollow section 22. Later removal of the core 30 is facilitated by the central aperture 32 which is formed from the disk-shaped protuberances 66, 67 and by the passages 24, 26 which are formed from the locating members 27, 28.

The core 30 may be prepared by such methods as injection molding, and may be made of a plastic material which is melted by heating. Preferably, the material from which the core is formed include natural and synthetic waxes such as paraffin wax and water-soluble waxes, together with moldable synthetic resins such as polystyrene, urea resin, and foamed polystyrene. Good results have been obtained by preparing a sand core by mixing sand and a binder in a muller. The mixture is then transferred to a warm core box into which it is forced by compressed air, and then cured with a hot gas. After removal from the core box, the newly formed core is dipped in the binder for further strengthening so that it possesses not only hot strength but also resistance to molding material and molten metal. The core is then checked for strength and weight to ensure structural integrity, dipped in paraffin, and then placed in a drying rack.

Figure 9:
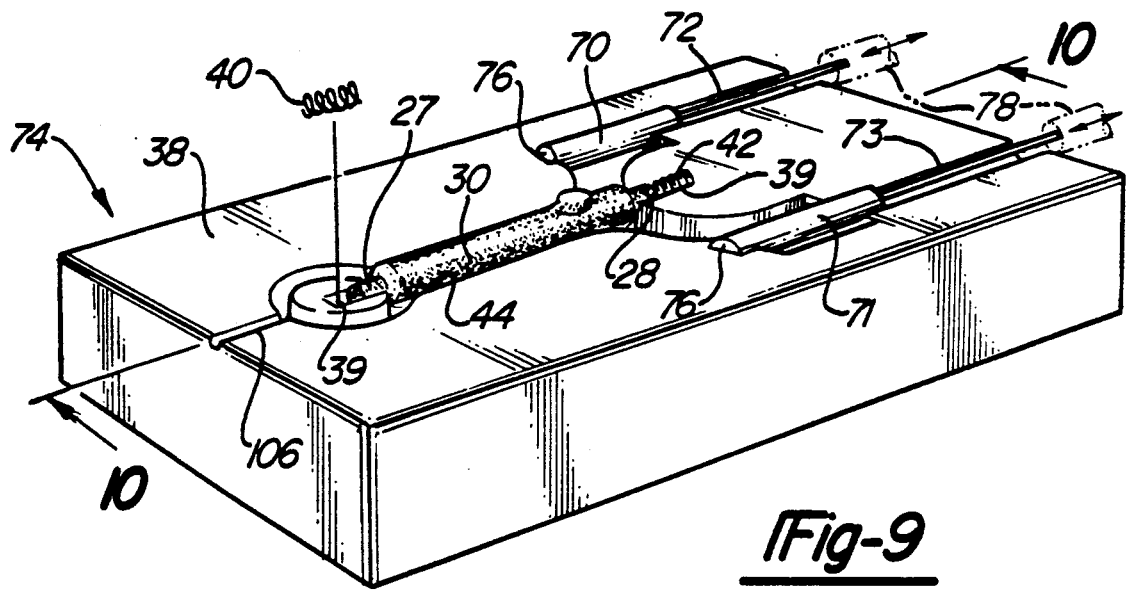
FIG. 9 is a perspective view of a lower portion of the manufacturing apparatus including a die and a core prior to injection of molding material by which a pattern of the connecting rod of the present invention is made.
Figure 10:
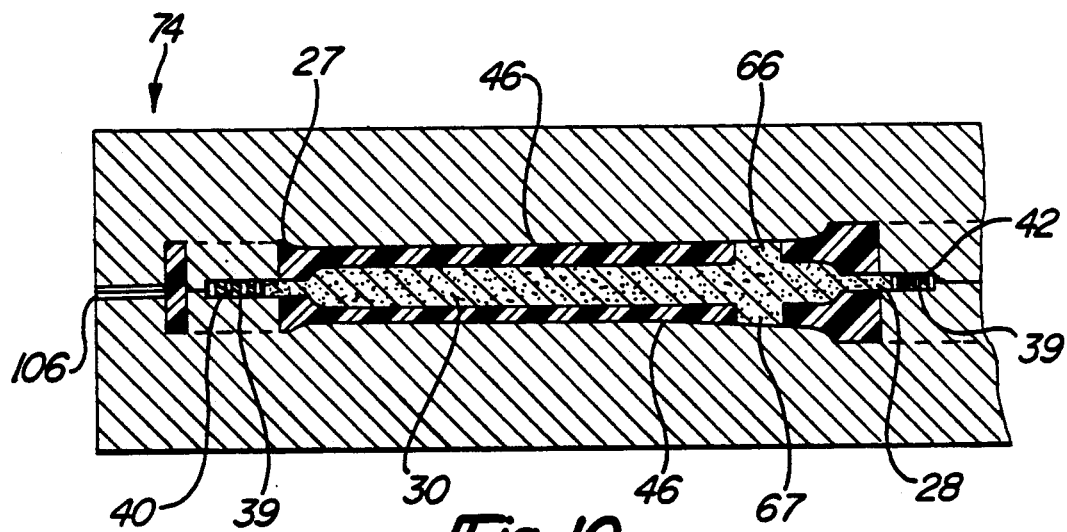
FIG. 10 is a vertical sectional view of an assembled die including the pattern of molding material which encapsulates the core to form the pattern of the connecting rod of the present invention, taken along the line 10—10 of FIG. 9.

The next step (step 102) is to make the pattern 48 of the connecting rod 10. After drying, the core 30 is placed in a die 38, preferably made of a material such as aluminum, in which it is secured by retaining means 39 such as a pair of retainers 40, 42 mounted in the die. As illustrated in FIGS. 9 and 10, the retainers 40, 42 engage the locating members 27, 28 of the core 30 so that it cooperates with the die 38 to define a cavity 44 therebetween for forming the pattern 48 of the connecting rod 10.

FIG. 9 depicts a lower portion of the die 38 after positioning of the core 30 and before injection of a molding material 46 into the cavity 44 between the core 30 and the die 38. In practice, the die 38 may be water cooled for process control. An upper portion of the die 38 is then secured to the lower portion under clamping pressure which may amount to about 80 tons. Next, the molding material 46 is injected into the cavity 44 via a gate, runner, or sprue. In practice, the molding material may be a highly reclaimable temperature-controlled wax, which forms the pattern 48 of the connecting rod 10. After cooling and solidification, the molding material 46 substantially encapsulates the core 30. It is desirable that the material used for making the core 30 has a melting point which is higher than the molding material 46 used for forming the pattern 48 of the connecting rod 10 so that the core 30 is not melted or decomposed during the pattern-making step 102.

The pattern 48 is then removed from the die 38. The dimensions of the pattern 48 are checked for accuracy and consistency, taking shrink factors into consideration. If desired, an etching step 108 can be performed after the pattern 48 is made in order to impart a smooth finish thereto.

Figure 11:
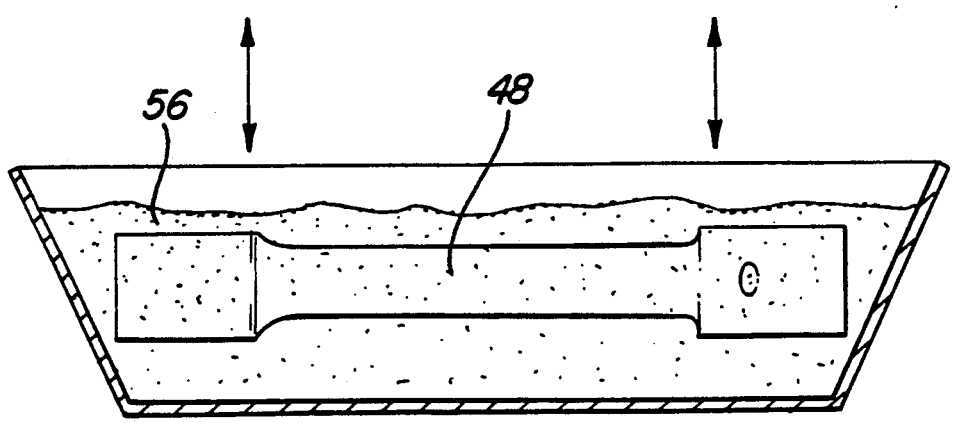
FIG. 11 is a schematic view depicting repeated immersion in a refractory material to form a shell mold which encapsulates one or more patterns of the connecting rod of the present invention.

At this stage, good results have been achieved by attaching either by hand or using automated approaches a number of patterns (four, for example) to a downsprue (step 106) which is coated by the molding material (step 104). An assembly of patterns 48 is then coated with a refractory material, such as a ceramic refractory material, to form a shell mold 54 which encrusts each pattern 48. As also depicted in FIG. 11, the shell mold 54 is prepared in step 110 (FIG. 8) by dipping each pattern 48 in slurry and drawing it through a fluidized bed of fine sand 50 to provide a good surface finish to the interior of the shell mold 54. In practice, the slurry may include water and colloidal silica, or ethyl silicate, or alcohol Additional layers of coarse sand 52, or stacco particles, are applied in order to thicken the shell mold 54. The cycle of dipping in the slurry and applying coarse sand is repeated until the shell mold 54 has a desired thickness for added strength Between each coating, the shell mold 54 passes through a drying room where temperature and humidity are set to provide optimum results. Upon hardening, the shell mold 54, the locating members 27, 28, and the protuberance 66 of the core 30 cooperate therewith to secure the core 30 in relation to the shell mold 54 and to facilitate precise dimensional control of the connecting rod 10.

In practice, it has been found useful to dry the shell molds 54 (step 110) and retain a number of them in storage while in process to maximize throughput and efficiency (step 112).

Next, the shell mold 54 is placed in an auto clave (step 114) where super-heated steam rapidly melts and removes the molding material so that it can be reused (step 116). The shell mold 54 is heated to a temperature at least of about 1,000° C. This step is analogous to a dewaxing step wherein wax 46 surrounding the core 30 is removed. After removal of the molding material 46, the ceramic shell mold 54 is baked to obtain a hardened mold 54 in which the core 30 is fixed in position (step 114).

In a subsequent step (step 118), a molten metal is poured into the cavity 44 defined by the inner-periphery of the shell mold 54 and the core 30. In practice, the molten metal may be medium carbon alloy steel, medium alloy steel, austempered iron, ductile iron, or their equivalents. As soon as the pouring process is completed, the assembly is run through a water quench. This step promotes directional solidification so that the downsprue feeds the casting. Quenching also makes it easier to remove the sprue. By this point in the process, the shell mold 54 and the core 30 sandwich therebetween a near net shape of the connecting rod 10, the surface finish and overall dimensions of which closely approximately those required in the finished part.

After cooling (step 120) to solidify the cast metal, the shell mold 54 is removed by destruction through vibrating means, including jarring and jolting. Often, a knock out unit is used to vibrate the shell mold 54 loose from the connecting rod 10 (step 122). If needed, unnecessary portions of the shell mold 54 may be cut away by machining (step 124). The core 30 and connecting rod 10 from which the shell mold 54 has been broken loose are then placed in a molten caustic soda solution, which acts as an irrigating and cleaning agent, which cleanses the connecting rod 10 and removes core material 30 (step 126). Any residual core material can be removed through the central aperture 32 or through either of the passages 24, 26. If desired, a shot blasting process may be invoked to provide a final finish to the connecting rod 10 (step 128). An annealing step can be undertaken to remove stress, enhance machinability, and to prepare the connecting rod 10 for induction heating, which tempers the contact surfaces of the connecting rod 10 to impart thereto excellent wear characteristics. Often, component integrity is tested by magnetic particle inspection. Ultrasonic testing may be used to verify the uniformity of wall thickness in the elongate tubular shank member 11 of the connecting rod 10. Such steps may by supplemented by X-ray inspection to establish proper process parameters and by other inspections to assure acceptable dimensions.

The connecting rod 10 produced in accordance with the process of the present invention has a relatively complex, carefully defined shape. It is anticipated that shapes associated with other components may easily be produced by the application of the process of this invention.

Turning now to FIGS. 12-15, there is shown in FIG. 12 a perspective view of the shell mold 54, which encrusts the elongate tubular shank member, the piston connecting member 14, and the crankpin connecting member 18. Also apparent in FIG. 12 is an outline of the disk-shaped protuberance 66 and bolt holes 58, 60. In practice, the bolt holes 58, 60 are prepared by positioning a pair of cylindrical members 70, 71 (See FIG. 9) in channels 72, 73 provided within the die 38. Each cylindrical member 70, 71 defines a bolt hole 58, 60 within the crankpin connecting member 18 of the connecting rod 10. In operation, each cylindrical member 70, 71 is moved between an engaged position 76 prior to and during injection of the molding material 46 to a retracted position 78 prior to removal of the solidified pattern 48 of the connecting rod 10. As a result, drilling is not required, and finishing steps are obviated For added clarity, FIG. 13 is a cross-sectional view of the shell mold 54 as it appears after injection of the molding material 46. The outer layer is the shell mold 54, which envelopes the molding material 46, which in turn surrounds the core 30. FIG. 14 is a sectional view at the same location as FIG. 13, depicting the core 30 and the shell mold 54 after removal of the molding material 46. In FIG. 15, the sectional view depicts the shell mold 54 after the molten metal 56 is poured into the cavity 44 between the core 30 and the shell mold 54.

Continuing with primary reference to FIGS. 9-10, the apparatus 74 for manufacturing the connecting rod 10 includes means 39 for retaining the core 30. The retaining means 39 may, for example, include spring loaded retainers 40, 42 mounted within the die 38. Each retaining means 39 engages a locating member 27, 28 of the core 30 so that the core 30 is securely positioned within the die 38. The retaining means 39 secure the core 30 with respect to the die 38 in the face of turbulent hydrodynamic forces exerted on the core 30 by the molding material 46 during its injection into the cavity 44. Such retaining means 39 enable the preparation of thin walls 15 in the elongate tubular shank member 11 by precisely fixing the core 30 in relation to the die 38.

With continuing reference to FIG. 9, the pair of channels 72, 73 lie on opposite sides of one of the retainers 42. As is apparent from FIG. 10, the core 30 is secured within the shell mold 54 not only by the retainers 40, 42 but also by the disk shaped protuberances 66, 67 extending radially from the core 30. After casting, as can best be seen in FIG. 16, the core 30 is secured within the shell mold 54 by locking surfaces 82, 84, 86, 87. Two of the locking surfaces 82, 84 are associated with the locating members 27, 28. Another two of the locking surfaces 86, 87 are associated with the disk shaped protuberances 66, 67. These locking surfaces 82, 84, 86, 87 of the core 30 engage the ceramic material of the shell mold 54 during the casting steps. Thus, the core 30 is supported for accurate location initially within the injection die 38 by the retainers 40, 42 and later, after molding material 46 is removed from the shell mold 54. During injection and solidification of molding material 46 within the die 38, the core 30 is supported at each end by the spring-loaded metal retainers 40, 42 which are housed within the die 38.

The locating members 27, 28 nestle in a pair of indentations, known as core prints 88, 90, which are defined in the die 38. During wax removal, the locating members 27, 28 and the disk shaped protuberances 66, 67 cooperate with the shell mold 54 to form the locking surfaces 82, 84, 86, 87 between the shell mold 54 and the core 30.

As will be apparent, the problems of core displacement by molding material 46 during injection into the die 38 are solved by the secure retention of the core by the retainers 40, 42 in the die 38. Core displacement by molten metal 56 during casting is solved by the locking surfaces 82, 84, 86 between the shell mold 54 and the die 38.

Following the teachings of the precision casting process disclosed by this invention, thin walls 15 of the elongate tubular shank member 11 are now consistently formed, thereby producing stiffness to weight characteristics which were hithertofore unattainable. In practice, for a given material selected, the wall thickness and outside diameter of the elongate tubular shank member 11 are selected to enable the connecting rod 10 to withstand significant tensile and compressive loads while exhibiting favorable fatigue properties. For example, where steel is selected, the shank size designed to exhibit the desired properties has a wall thickness of about 2.0 mm and an outside diameter of about 15.0 mm. It has been found that the theoretical minimum wall dimensions that are attainable by the precision casting process of the present invention are so thin that they result in impractically large outside diameters of the elongate tubular shank portion 11. Where the wall thickness is about 1 mm, the outside diameter of the elongate tubular shank member is about 25 mm.

In summary, the overall result of the process taught by this invention is a high quality component which is both cost-effective because drilling and finishing steps are avoided and light in weight because core locking enables thin walls bounding hollow sections to be produced.

Thus, it is apparent that there has been provided in accordance with the invention a connecting rod, a method by which it is prepared, and manufacturing apparatus which is used in the process which addresses the needs and solves the problems remaining from conventional practices. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

What is claimed is:

1. A process for casting a hollow connecting rod for use in an engine, the connecting rod comprising an elongate tubular shank member, the process comprising the steps of:

preparing an elongate core having an axially extending locating member positioned at each end thereof and a pair of disk-shaped protuberances extending radially from the core, the core defining a hollow section in the elongate tubular shank member, each locating member defining a passage extending axially from the hollow section, and the disk-shaped protuberances defining a central aperture extending radially from the hollow section;

securing the core in a die by a pair of axially disposed retainers that engage the locating members of the core so that the core cooperates with the die to define a cavity therebetween for forming a pattern of the connecting rod;

injecting a molding material into the cavity between the core and the die, and cooling the molding material to form the pattern of the connecting rod, the molding material substantially encapsulating the core;

removing the pattern from the die;

coating the pattern with a refractory material to form a shell mold which encrusts the pattern, the shell mold, the axially extending locating members and the radially extending disk-shaped protuberances of the core cooperating with the shell mold to secure the core precisely therewithin to facilitate precise dimensional control of the connecting rod;

heating the shell mold to meld the molding material for removal thereof from the shell mold;

filling the cavity between the core and the shell mold with molten metal and cooing the metal to form a near net shape of the connecting rod; and separating the shell mod from the solidified metal and removing the core from the hollow section of the connecting rod to eliminate unwanted material therefrom.

2. The process of claim 1, further comprising the step of positioning a pair of cylindrical members in channels provided within the die, each cylindrical member defining a bolt hole within the crankpin connecting member of the connecting rod.

3. The process of claim 2, further comprising the steps of:

attaching a plurality of patterns of the connecting rod to a downsprue coating with the molding material to form an assembly of patterns; and dipping the assembly in a fluidized bed of fine refractory material to provide a good surface finish thereto.

4. The process of claim 3, further comprising the step of applying additional layers of coarse refractory material to thicken each shell mold in the assembly and hardening them for added strength.

5. The process of claim 4, wherein the step of separating the shell mold from the solidified metal further comprises dipping each connecting rod encrusted by portions of the shell mold into an irrigating and cleaning agent to remove the core and cleanse the connecting rod.

6. The process of claim 5, further including the step of imparting a final finish to the connecting rod.

7. The process of claim 6, further including the step of annealing the connecting rod to remove stress and enhance machinability.

8. The process of claim 1, wherein the step of injecting a molding material into the cavity is performed so that the molding material substantially encapsulating the core does not pass between the radially extending disk-shaped protuberances thereof and the die to facilitate the formation of the radially extending central aperture.

9. The process of claim 1, wherein the step of injecting a molding material into the cavity is performed so that the axially extending locating members of the elongate core extend beyond the molding material so that the locating members will be securable within the shell mold.

10. The process of claim 1, wherein the step of coating the pattern with a refractory material to form a shell mold which encrusts the pattern includes the step of engaging the axially extending locating members of the core within the shell mold to fixedly secure the core therewithin.

* * * * *

UNITED STATES PATENT AND TRADEMARK OFFICE
CERTIFICATE OF CORRECTION

PATENT NO. : 5,063,992

DATED : November 12, 1991

INVENTOR(S) : Robert Mrdjenovich and David A. Yeager

It is certified that error appears in the above-identified patent and that said Letters Patent is hereby corrected as shown below:

ON THE TITLE PAGE: Item No. [62] should read as follows: Division of Ser. No. 388,101, July 31, 1989.

On the face page of the patent, under Item No. [56] "References Cited", the patentee's name for U.S. Patent No. 4,836,045 should be --Lobig--.

Column 1, delete lines 4-5 completely.

Column 5, line 18, delete "3" and substitute --13--.

Column 7, line 22, after "alcohol" insert a period (.).

Column 7, line 27, after "strength" insert a period (.).

Column 10, line 39, Claim 1, delete "meld" and substitute --melt--.

Column 10, line 42, Claim 1, delete "cooing" and substitute --cooling--.

Column 10, line 44, Claim 1, delete "mod" and substitute --mold--.

Signed and Sealed this

Second Day of March, 1993

*Attest:*

STEPHEN G. KUNIN

*Attesting Officer*    *Acting Commissioner of Patents and Trademarks*